United States Patent
Fukumoto et al.

(10) Patent No.: US 10,839,681 B2
(45) Date of Patent: Nov. 17, 2020

(54) CONTROL DEVICE AND METHOD FOR CONTROLLING AUTONOMOUS DRIVING VEHICLE

(71) Applicant: Panasonic Intellectual Property Management Co., Ltd., Osaka (JP)

(72) Inventors: Satoshi Fukumoto, Tokyo (JP); Takafumi Tokuhiro, Kanagawa (JP); Ichiro Yamane, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 122 days.

(21) Appl. No.: 16/308,498

(22) PCT Filed: Jul. 27, 2017

(86) PCT No.: PCT/JP2017/027202
§ 371 (c)(1),
(2) Date: Dec. 10, 2018

(87) PCT Pub. No.: WO2018/021463
PCT Pub. Date: Feb. 1, 2018

(65) Prior Publication Data
US 2019/0272750 A1 Sep. 5, 2019

(30) Foreign Application Priority Data
Jul. 29, 2016 (JP) ................. 2016-149699

(51) Int. Cl.
*G08G 1/0965* (2006.01)
*B60W 30/095* (2012.01)
(Continued)

(52) U.S. Cl.
CPC ....... *G08G 1/0965* (2013.01); *B60W 30/0956* (2013.01); *G08G 1/096725* (2013.01);
(Continued)

(58) Field of Classification Search
CPC .......... G06K 9/00228; G06K 9/00825; G06K 9/6267; G06K 9/00791; G06K 9/3233;
(Continued)

(56) References Cited

U.S. PATENT DOCUMENTS 9,633,560 B1 * 4/2017 Gao ................... G08G 1/0145
10,259,457 B2 * 4/2019 Meyer ................ G06K 9/00791
(Continued)

FOREIGN PATENT DOCUMENTS

| JP | 2006-131055 | 5/2006 |
| JP | 2009-298193 | 12/2009 |
| JP | 2010-095078 | 4/2010 |

OTHER PUBLICATIONS

International Search Report of PCT application No. PCT/JP2017/027202 dated Oct. 24, 2017.
(Continued)

*Primary Examiner* — Behrang Badii
(74) *Attorney, Agent, or Firm* — Greenblum & Bernstein, P.L.C.

(57) ABSTRACT

A control device for an autonomous driving vehicle includes a first input section, a second input section, and a travel state determination section. The first input section acquires a detection signal of a first sensor that detects another vehicle approaching the intersection. The second input section acquires a detection signal of a second sensor that detects at least one of a gesture of a driver of the other vehicle, a voice of the driver of the other vehicle, a motion of the other vehicle, and a radio signal output from the other vehicle. The travel state determination section generates, upon detection of the other vehicle based on the detection signal of the first sensor, a travel command signal for allowing or restricting entry of the autonomous driving vehicle into the intersection
(Continued)

in accordance with an action of the other vehicle predicted based on the detection signal of the second sensor.

5 Claims, 6 Drawing Sheets

(51) Int. Cl.
| | |
|---|---|
| *G08G 1/0967* | (2006.01) |
| *G08G 1/16* | (2006.01) |
| *B60W 50/00* | (2006.01) |
| *G06K 9/32* | (2006.01) |
| *G06K 9/00* | (2006.01) |
| *G05D 1/02* | (2020.01) |
| *B60W 40/08* | (2012.01) |

(52) U.S. Cl.
CPC ......... *G08G 1/096791* (2013.01); *G08G 1/16* (2013.01); *B60W 40/08* (2013.01); *B60W 2050/008* (2013.01); *B60W 2420/42* (2013.01); *B60W 2420/54* (2013.01); *B60W 2540/20* (2013.01); *B60W 2540/21* (2020.02); *B60W 2756/10* (2020.02); *G05D 1/02* (2013.01); *G06K 9/00825* (2013.01); *G06K 9/3233* (2013.01)

(58) Field of Classification Search
CPC .......... G08G 1/16; G08G 1/161; G08G 1/166; G08G 1/0112; G08G 1/087; G08G 1/0962; G08G 1/096716; G08G 1/096741; G08G 1/09675; G08G 1/096783; G08G 1/096791; G08G 1/0965; G08G 1/096725; B60K 35/00; B60W 30/06; B60W 30/18154; B60W 40/08; B60W 50/08; B60W 50/10; B60W 10/20; B60W 10/04; B60W 10/184; B60W 40/04; B60W 30/0956; B60W 2540/21; B60W 2756/10; B60W 2050/008; B60W 2420/42; B60W 2420/54; B60W 2540/20; B60W 30/09; B60W 30/12; B60W 30/16; B60W 40/00; G05D 1/0246; G05D 1/02; G05D 1/0088; B60Q 1/50; H04W 4/70; H04W 4/80; H04W 68/005; H04W 4/40; H04W 4/46; G01S 13/88; G01S 15/88; G01S 17/88; G01C 21/30; G01C 21/26

See application file for complete search history.

(56) References Cited

U.S. PATENT DOCUMENTS

| | | | |
|---|---|---|---|
| 2006/0095195 A1 | 5/2006 | Nishimura et al. | |
| 2015/0329107 A1* | 11/2015 | Meyer | B60W 30/143 701/28 |
| 2016/0209844 A1* | 7/2016 | Lombrozo | B60W 30/09 |
| 2017/0057514 A1* | 3/2017 | Toyoda | B60W 30/18154 |
| 2017/0131719 A1* | 5/2017 | Micks | G06K 9/3233 |
| 2017/0176993 A1* | 6/2017 | Kato | G01C 21/3492 |
| 2017/0213462 A1* | 7/2017 | Prokhorov | G08G 1/0965 |
| 2017/0287338 A1* | 10/2017 | Neubecker | G08G 1/162 |
| 2017/0301237 A1* | 10/2017 | MacNeille | H04W 68/005 |
| 2017/0329337 A1* | 11/2017 | Kusano | G08G 1/09675 |

OTHER PUBLICATIONS

Notice of Reasons for Refusal in Japan dated Apr. 28, 2020 for the related Japanese Patent Application No. 2016-149699.

* cited by examiner

CONTROL DEVICE AND METHOD FOR CONTROLLING AUTONOMOUS DRIVING VEHICLE

CROSS-REFERENCE TO RELATED APPLICATIONS

This application is a U.S. national stage application of the PCT International Application No. PCT/JP2017/027202 filed on Jul. 27, 2017, which claims the benefit of foreign priority of Japanese patent application 2016-149699 filed on Jul. 29, 2016, the contents all of which are incorporated herein by reference.

TECHNICAL FIELD

The present invention relates to a control device and a control program for an autonomous driving vehicle.

BACKGROUND ART

A technique for generating an optimum travel route for a subject vehicle and performing autonomous driving control based on the travel route has been developed. In order to achieve the autonomous driving control, travel control is performed such that a subject vehicle adheres to traffic rules for roads such as a traffic light, a speed limit, and a temporary stop for safety travel (refer to PTL 1).

CITATION LIST

Patent Literature

PTL 1: Unexamined Japanese Patent Publication No. 2006-131055

SUMMARY OF THE INVENTION

The present invention provides a control device and a control program for an autonomous driving vehicle that can prevent an autonomous driving vehicle and another vehicle from both politely urging the other to go ahead and resulting in a deadlock at an intersection or the autonomous driving vehicle from entering the intersection at the same time with the other vehicle.

An aspect of the present invention is a control device for an autonomous driving vehicle that controls travel at an intersection that is ahead of the autonomous driving vehicle in a travel direction. The control device includes a first input section, a second input section, and a travel state determination section. The first input section acquires a detection signal of a first sensor that detects another vehicle approaching the intersection. The second input section acquires a detection signal of a second sensor that detects at least one of a motion of a driver of the other vehicle, a voice of the driver of the other vehicle, a motion of the other vehicle, and a radio signal output from the other vehicle. The travel state determination section generates, upon detection of the other vehicle based on the detection signal of the first sensor, a travel command signal for allowing or restricting entry of the autonomous driving vehicle into the intersection in accordance with an action of the other vehicle predicted based on the detection signal of the second sensor.

The control device for an autonomous driving vehicle according to the present invention can prevent the autonomous driving vehicle and the other vehicle from both politely urging the other to go ahead and resulting in a deadlock at an intersection or the autonomous driving vehicle from entering the intersection at the same time with the other vehicle.

DESCRIPTION OF EMBODIMENTS

Before exemplary embodiments of the present invention are described, problems found in a conventional technique will be briefly described. In a real motorized society, there is a case where traffic rules are not stipulated or a case where, although traffic rules are stipulated, one politely urges the other to go ahead; thus, when travel control of an autonomous driving vehicle is performed based only on such traffic rules, a driver of another conventional vehicle may be confused.

In particular, at an intersection or the like having no traffic light, even if a priority road is specified in the traffic rules, cases where one driver politely urges the other driver to go ahead through, for example, eye contact or the like often occur; thus, when neither of the drivers moves forward, it results in a deadlock.

In other words, in order to make traffic smooth in a situation where an autonomous driving vehicle and a conventional vehicle coexist, it is required that the autonomous driving vehicle predict an action of the driver of the other conventional vehicle and perform travel control based on the prediction.

First Exemplary Embodiment

Hereinafter, an example of a configuration of a control device for an autonomous driving vehicle according to a first exemplary embodiment will be described with reference to FIG. 1 and FIG. 2.

Figure 1:
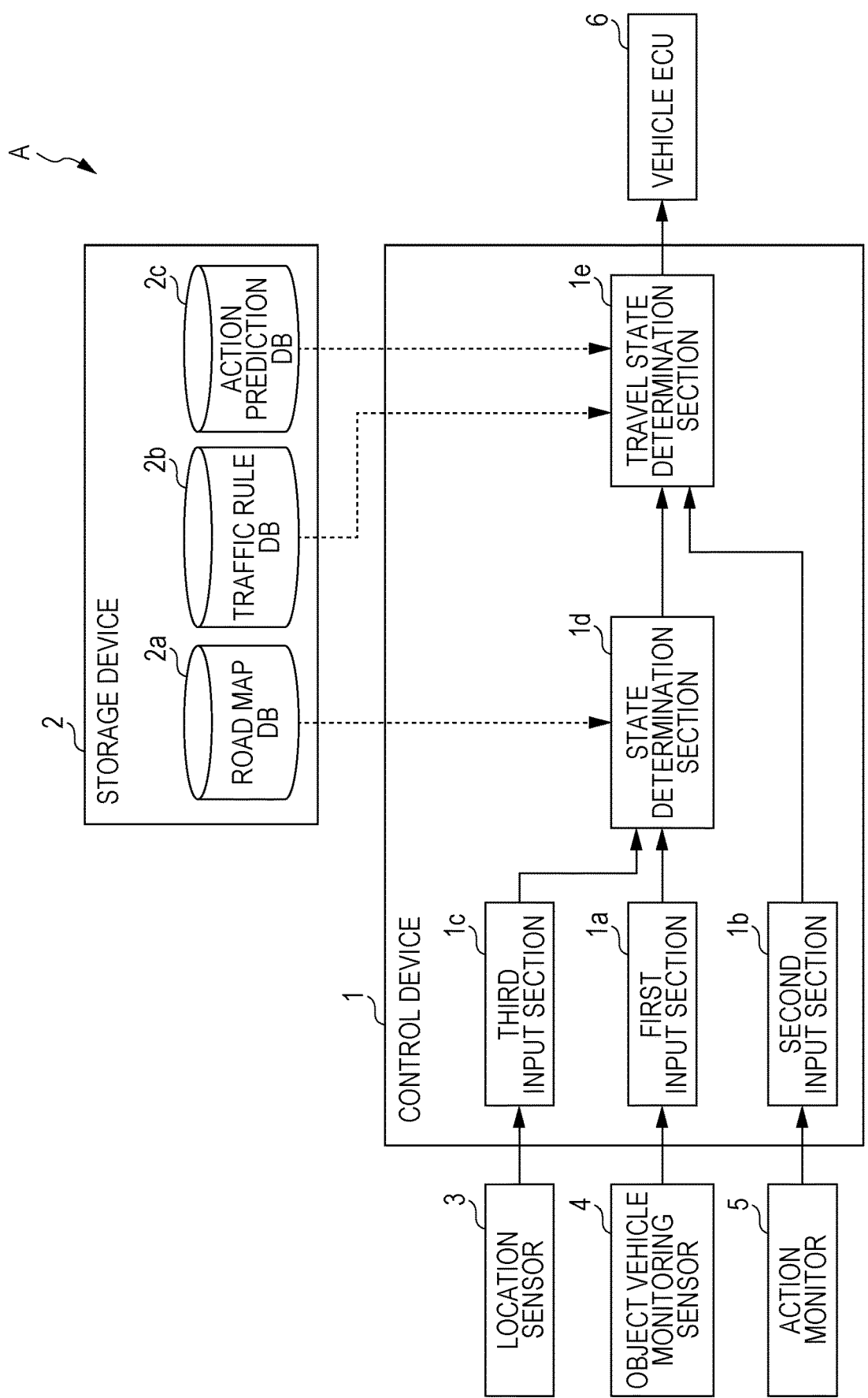
FIG. 1 is a diagram showing an example of a functional configuration of a control device according to a first exemplary embodiment.

FIG. 1 is a diagram showing an example of a functional configuration of autonomous driving vehicle A according to the present exemplary embodiment.

Autonomous driving vehicle A according to the present exemplary embodiment (hereinafter, abbreviated as "vehicle A" or "subject vehicle A") includes control device 1, storage device 2, location sensor 3, object vehicle monitoring sensor 4, action monitor 5, vehicle ECU (electronic control unit) 6. Note that arrows in FIG. 1 indicate data flow.

In the present exemplary embodiment, control device 1 performs data communication with storage device 2, location sensor 3, object vehicle monitoring sensor 4, and action monitor 5 to detect an intersection where subject vehicle A may meet an object vehicle and generates a travel command signal for determining a travel state at the intersection (details will be described later).

Note that the travel command signal generated by control device 1 is, for example, transmitted to vehicle ECU 6 for autonomous driving control in vehicle ECU 6.

Figure 2:
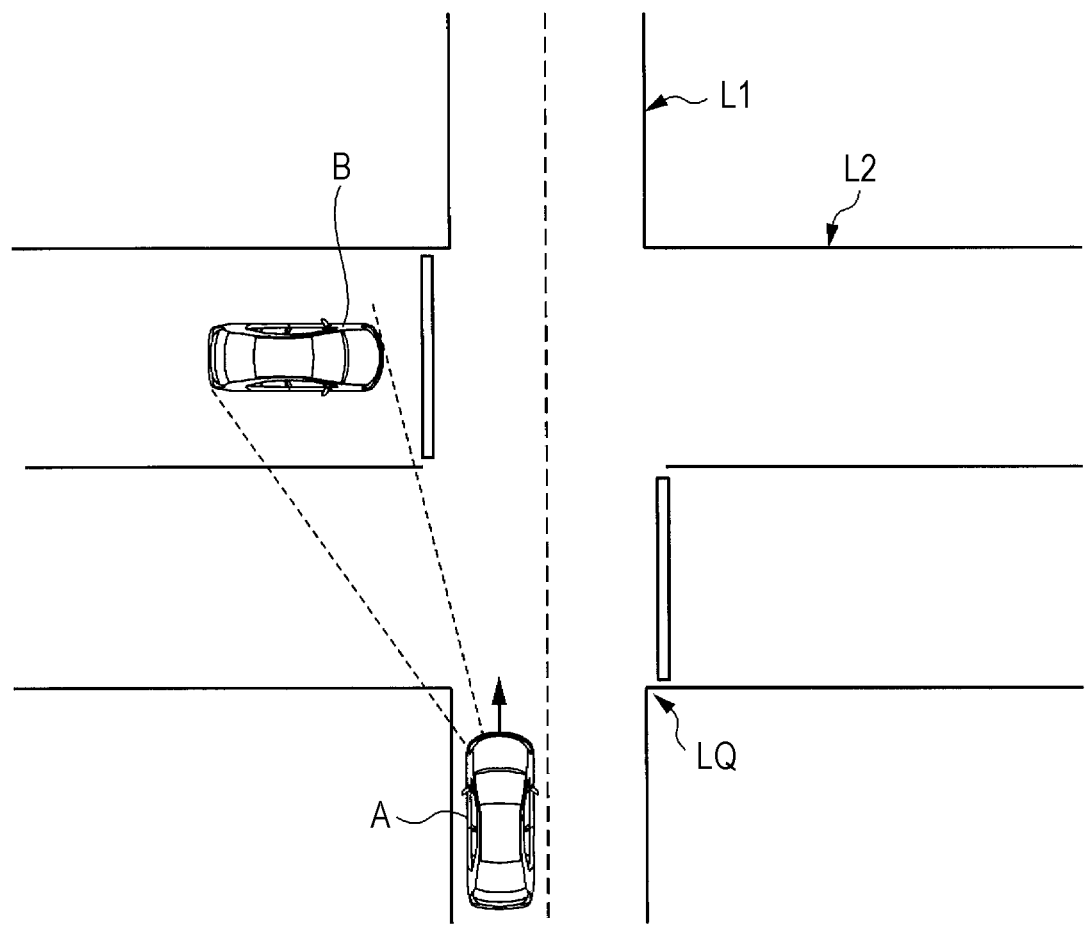
FIG. 2 is a diagram showing an example of an intersection to which the control device according to the first exemplary embodiment is applied.

FIG. 2 is a diagram showing an example of intersection LQ where subject vehicle A meets object vehicle B. FIG. 2 shows, as an example of intersection LQ, an intersection where travel lane (lane) L1 and travel lane (lane) L2 cross and no traffic signal is present.

Hereinafter, a configuration of each component will be described with reference to FIG. 1.

Location sensor 3 is a sensor that detects the current location of subject vehicle A.

Examples of location sensor 3 include a global positioning system (GPS) receiver. Location sensor 3 generates, for example, a detection signal indicating the current location of subject vehicle A based on GPS signals received from a plurality of GPS satellites. Note that it is needless to say that location sensor 3 may be implemented by a component other than the GPS receiver, such as a speed sensor or an orientation sensor, and uses autonomous navigation positioning to determine the current location of subject vehicle A.

Object vehicle monitoring sensor 4 (corresponds to a "first sensor") detects object vehicle B approaching intersection LQ that is ahead of subject vehicle A in a travel direction.

Examples of object vehicle monitoring sensor 4 include a millimeter-wave radar. Object vehicle monitoring sensor 4 recognizes, for example, a distance from subject vehicle A to object vehicle B and a direction of object vehicle B from subject vehicle A based on a signal transmitted from and received by the millimeter-wave radar and generates a detection signal indicating presence of object vehicle B approaching intersection LQ that is ahead of subject vehicle A in the travel direction. Note that it is needless to say that object vehicle monitoring sensor 4 may be implemented by a component other than the millimeter-wave radar, such as an on-vehicle camera that takes an image of vehicle surroundings.

Action monitor 5 (corresponds to a "second sensor") monitors a motion or the like of a driver of object vehicle B to predict an action of object vehicle B.

Examples of action monitor 5 include an on-vehicle camera that takes an image of vehicle front view. Then, action monitor 5 causes the on-vehicle camera to take an image of a motion of the driver of object vehicle B or a motion of object vehicle B and transmits an image signal corresponding to the image, that is a motion image, to control device 1. Action monitor 5 takes an image of, for example, a motion of the driver of object vehicle B, such as eye contact or hand waving, or a motion of object vehicle B, such as flashing of blinkers.

The motion of the driver of object vehicle B or the motion of object vehicle B whose image has been taken by the on-vehicle camera is, for example, subjected to pattern recognition in control device 1 based on data in an action prediction database (DB) 2c, thereby identifying what kind of intention the motion indicates. In other words, a prediction is made, based on the motion or the like of the driver of object vehicle B, about what kind of action object vehicle B will take next at intersection LQ.

Note that action monitor 5 may be implemented by a sensor other than the on-vehicle camera as long as action monitor 5 can predict the action of object vehicle B. Action monitor 5 may be a sensor that detects at least one of a motion of the driver of object vehicle B, a voice of the driver of object vehicle B, a motion of object vehicle B, and a radio signal output from object vehicle B. The sensor that detects the radio signal output from object vehicle B may be a sensor that detects, for example, an optical signal from a laser transmitter or a headlight, an acoustic signal from an ultrasound transmitter or a horn, a radio wave signal, and the like.

Storage device 2 includes, for example, a hard disk drive (HDD), a flash memory, or the like. Storage device 2 stores various processing programs to be executed by control device 1 and various pieces of data. The pieces of data stored in storage device 2 are loaded to, for example, a random access memory (RAM) or the like of control device 1 and used. Note that such pieces of data may be successively downloaded from the Internet and stored into storage device 2 in accordance with a location of vehicle A or an operation made by a user.

Storage device 2 stores road map DB 2a, traffic rule DB 2b, and action prediction DB 2c.

Road map DB 2a is a road map data-related database storing a road map and coordinates of the road map with the road map and the coordinates associated with each other. The road map in road map DB 2a includes, for example, locations of intersections LQ, locations of traffic lights, a number of lanes, and the like. Such a road map stores a latitude, a longitude, and the like, and coordinates relative to a predetermined location (for example, intersection LQ near vehicle A) with the latitude, the longitude, and the like, and the coordinates associated with each other.

Traffic rule DB 2b is a traffic rule-related database storing traffic rules for each location of roads. The traffic rules include, for example, a stipulation on a priority road and a non-priority road for intersection LQ. Note that the autonomous driving vehicle operates in accordance with the traffic rules in normal mode.

Action prediction DB 2c is a database storing "a motion of the driver of the object vehicle", "a motion of the object vehicle", or the like that is detected by action monitor 5 and "a predicted action of the object vehicle" predicted based on the motion with "a motion of the driver of the object vehicle", "a motion of the object vehicle", or the like and "a predicted action of the object vehicle" associated with each other.

"A motion of the driver of the object vehicle" stored in action prediction DB 2c corresponds to, for example, eye contact or hand waving, and "a motion of the object vehicle" corresponds to, for example, flashing of blinkers. Data related to "a motion of the driver of the object vehicle" corresponds to, for example, data related to shapes of parts of the driver of the object vehicle such as eyes, a mouth, and arms taken by action monitor 5 as camera images and changes with time of the shapes of the parts. "A motion of the driver of the object vehicle" or the like is identified through known pattern recognition processing that is performed by control device 1 (travel state determination section 1e to be described later) on the camera images taken by action monitor 5.

"A predicted action of the object vehicle" stored in action prediction DB 2c corresponds to an action that will be taken by object vehicle B at intersection LQ. Data related to "a predicted action of the object vehicle" corresponds to data storing types of actions such as an action of object vehicle B waiting until subject vehicle A passes through intersection LQ and an action of object vehicle B passing through intersection LQ without giving way to subject vehicle A.

Note that a correspondence between such a motion and predicted action may be preset or may be set through machine learning.

Note that, in accordance with a state of subject vehicle A or a state of object vehicle B at intersection LQ, action prediction DB 2c may store the motion and the like of the driver of the object vehicle detected by action monitor 5 and the predicted action of the object vehicle more finely with the motion and the like, and the predicted action associated with each other.

Control device 1 performs data communication with storage device 2, location sensor 3, object vehicle monitoring sensor 4, and action monitor 5 to detect intersection LQ where subject vehicle A may meet object vehicle B and generates the travel command signal for determining the travel state at intersection LQ.

Control device 1 includes, for example, a central processing unit (CPU), a read only memory (ROM), a random access memory (RAM), and the like. As described above, control device 1 performs data communication with storage device 2, location sensor 3, object vehicle monitoring sensor 4, and action monitor 5 to control the components or receive data (the detection signal) from the components. Note that transmission and reception of data between control device 1 and each of the components is performed, for example, over a signal line in accordance with the controller area network (CAN) communication protocol.

Control device 1 includes first input section 1a, second input section 1b, third input section 1c, state determination section 1d, and travel state determination section 1e.

First input section 1a acquires the detection signal generated by object vehicle monitoring sensor 4. First input section 1a forwards the detection signal of object vehicle monitoring sensor 4 to state determination section 1d.

Second input section 1b acquires the detection signal generated by action monitor 5. Second input section 1b forwards the detection signal of action monitor 5 to travel state determination section 1e.

Third input section 1c acquires the detection signal generated by location sensor 3. Third input section 1c forwards the detection signal of location sensor 3 to state determination section 1d.

Note that first input section 1a, second input section 1b, third input section 1c may be configured to directly acquire the detection signals from respective sensors or may be configured to acquire the detection signals via a car navigation device or the like. Alternatively, first input section 1a, second input section 1b, third input section 1c may acquire the detection signals in raw data format or may acquire data that has undergone predetermined signal processing. For example, third input section 1c may acquire, from action monitor 5, data that results from performing image analysis on the camera images.

State determination section 1d identifies intersection LQ that is ahead of subject vehicle A in the travel direction based on the detection signal of location sensor 3 and determines whether object vehicle B approaching intersection LQ is present based on the detection signal of object vehicle monitoring sensor 4.

Travel state determination section 1e generates the travel command signal for allowing or restricting entry into intersection LQ in accordance with the action of object vehicle B predicted based on the detection signal of action monitor 5. Travel state determination section 1e operates, for example, when state determination section 1d detects object vehicle B approaching intersection LQ that is ahead of subject vehicle A in the travel direction. Then, the travel command signal generated by travel state determination section 1e is transmitted to, for example, vehicle ECU 6.

Note that it is needless to say that although the "travel command signal" generated by travel state determination section 1e corresponds to, for example, a command signal for vehicle ECU 6 to allow or restrict entry into intersection LQ, the "travel command signal" may further include a command related to a running speed and the like.

Herein, control device 1 includes both state determination section 1d and travel state determination section 1e, but control device 1 may include only travel state determination section 1e. In such a configuration, travel state determination section 1e may be configured to receive data indicating presence of intersection LQ or presence of object vehicle B approaching intersection LQ from a different device including state determination section 1d.

Note that the above-described functions are implemented by, for example, the CPU referring to a control program and various pieces of data stored in the ROM, the RAM, or the like. Note that it is needless to say that such functions may be implemented by not only software processing but also a dedicated hardware circuit.

Vehicle ECU 6 controls, for example, a drive motor (not shown) for regulation of the running speed and the like of the vehicle including acceleration and deceleration. For centralized control of a driving state of vehicle A, vehicle ECU 6 receives the detection signals from the various sensors that detect the driving state of vehicle A and performs operations to bring each component that controls travel into an optimum state.

Vehicle ECU 6 performs, upon receiving the travel command signal from travel state determination section 1e, travel control of vehicle A to bring vehicle A into a state indicated by the travel command signal. When the travel command signal indicates allowing entry into intersection LQ, vehicle ECU 6 performs, for example, travel control without reducing the running speed at intersection LQ. When the travel command signal indicates restricting entry into intersection LQ, vehicle ECU 6 performs travel control to make a stop before intersection LQ.

[Operation Flow of Control Device]

Figure 3:
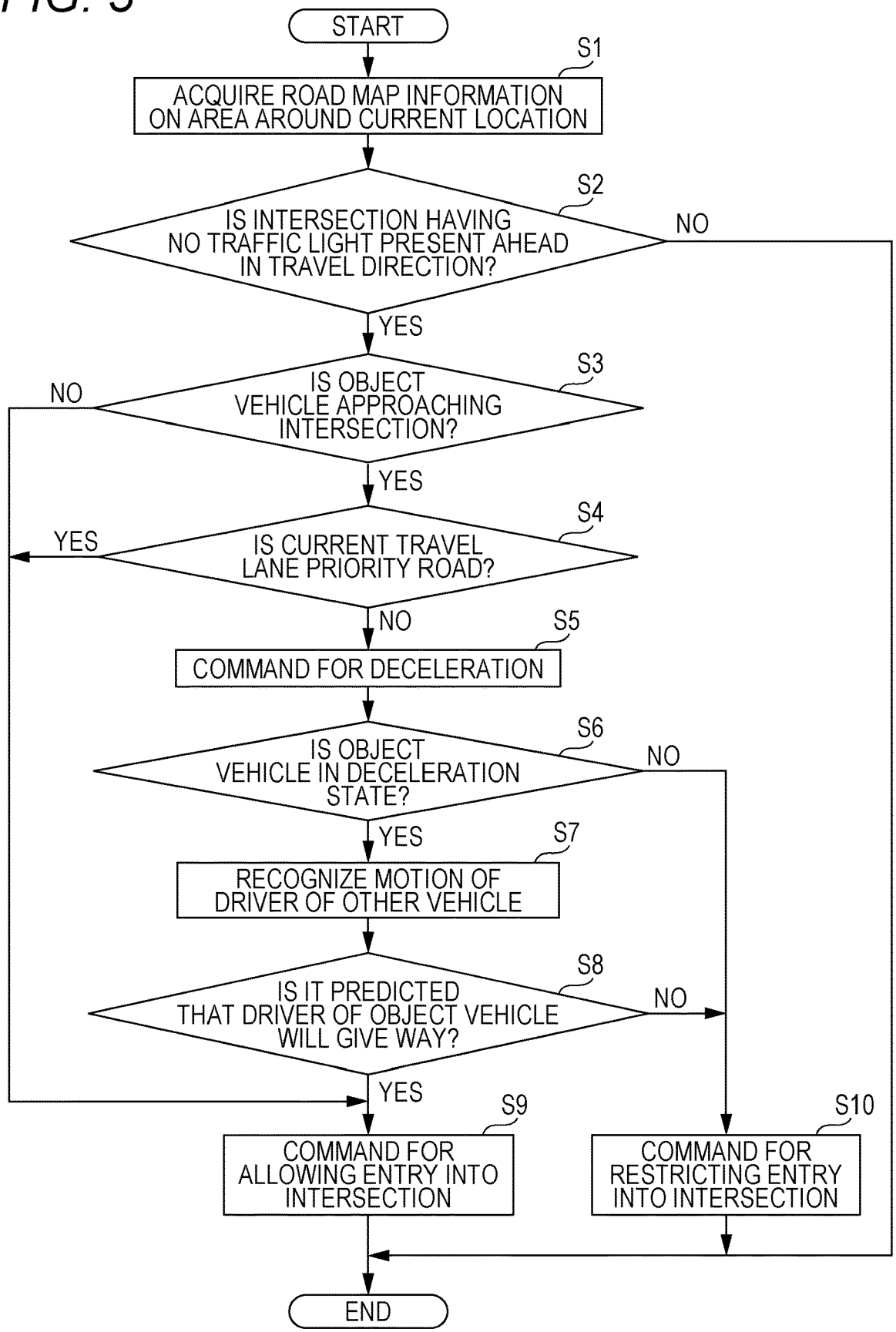
FIG. 3 is a diagram showing an example of an operation flow of the control device according to the first exemplary embodiment.

FIG. 3 is a diagram showing an example of an operation flow of control device 1 according to the present exemplary embodiment. Note that the operation flow shown in FIG. 3 is, for example, to be performed by control device 1 in accordance with a computer program.

Control device 1 performs the processing to determine timing where subject vehicle A is caused to enter intersection LQ when subject vehicle A approaches intersection LQ having no traffic signal as shown in FIG. 2, for example. In other words, the following processing is performed to determine whether subject vehicle A is caused to temporarily stop at intersection LQ or subject vehicle A is allowed to enter intersection LQ without a stop.

State determination section 1d first acquires road map information on an area around the current location of subject vehicle A (step S1).

In step S1, state determination section 1d acquires, via third input section 1c, the current location of subject vehicle A (for example, a latitude and a longitude) indicated by location sensor 3 and acquires a road map corresponding to the current location of subject vehicle A from road map DB 2a.

Next, state determination section 1d determines, based on the road map information on the area around the current location of subject vehicle A, whether intersection LQ having no traffic light is present ahead of subject vehicle A in the travel direction (step S2).

In step S2, when determining that intersection LQ having no traffic light is present ahead of subject vehicle A in the travel direction (step S2: YES), state determination section 1d performs the following determination processing of step S3 and the like to determine timing where subject vehicle A is caused to enter intersection LQ. In contrast, when determining that intersection LQ having no traffic light is not present (step S2: NO), state determination section 1d terminates the processing of the operation flow shown in FIG. 3.

Next, state determination section 1d determines whether object vehicle B is approaching intersection LQ (step S3).

In step S3, state determination section 1d acquires the detection signal of object vehicle monitoring sensor 4 via first input section 1a and determines, based on the detection signal, whether object vehicle B approaching intersection LQ is present. State determination section 1d determines whether object vehicle B approaching intersection LQ is present from, for example, changes with time of a location of object vehicle B that is detected by the millimeter-wave radar corresponding to object vehicle monitoring sensor 4.

In step S3, when state determination section 1d determines that the object vehicle is approaching intersection LQ (step S3: YES), travel state determination section 1e performs the following determination processing of step S4. When state determination section 1d determines that object vehicle B is not approaching intersection LQ (step S3: NO), travel state determination section 1e generates the travel command signal for allowing entry into intersection LQ to cause subject vehicle A to enter intersection LQ without a stop (step S9).

In step S4, travel state determination section 1e determines whether travel lane L1 on which subject vehicle A is traveling is a priority road at intersection LQ (step S4). This determination causes travel state determination section 1e to check whether to allow entry into intersection LQ without deceleration.

In step S4, travel state determination section 1e refers to traffic rule data in traffic rule DB 2b, the traffic rule data being applied to intersection LQ, to determine whether travel lane L1 on which subject vehicle A is traveling is a priority road.

In step S4, when travel lane L1 on which subject vehicle A is traveling is a priority road (step S4: YES), travel state determination section 1e generates the travel command signal for allowing entry into intersection LQ to cause subject vehicle A to enter intersection LQ without a stop because it is predicted that object vehicle B will stop before intersection LQ (step S9). In contrast, when travel lane L1 on which subject vehicle A is traveling is not a priority road (step S4: NO), travel state determination section 1e first generates a travel command signal for causing subject vehicle A to decelerate to cause subject vehicle A to stop before intersection LQ (step S5) and then performs the following processing of step S6.

Next, travel state determination section 1e determines whether object vehicle B approaching intersection LQ is in a deceleration state (step S6). This determination causes travel state determination section 1e to check a possibility that object vehicle B will stop before intersection LQ.

Herein, the deceleration state refers to a state where a vehicle is traveling at a speed less than or equal to or a certain speed, a state where the vehicle is traveling toward intersection LQ while decelerating, or a state where the vehicle waits until an object vehicle passes through before intersection LQ.

In step S6, when determining that object vehicle B is in the deceleration state (step S6: YES), travel state determination section 1e performs the following processing of steps S7, S8. In contrast, when determining that object vehicle B is not in the deceleration state (step S6: NO), travel state determination section 1e generates the travel command signal for restricting entry into intersection LQ to cause subject vehicle A to stop before intersection LQ until the object vehicle passes through intersection LQ because it is unlikely that object vehicle B will give way to subject vehicle A for entry into intersection LQ (step S10).

When determining that object vehicle B is in the deceleration state (step S6: YES), travel state determination section 1e next recognizes the motion of the driver of object vehicle B (step S7).

In step S7, after action monitor 5 (for example, an on-vehicle camera) is activated, travel state determination section 1e acquires the detection signal of action monitor 5 via second input section 1b. Herein, examples of the motion of the driver of object vehicle B include eye contact, hand waving that indicates giving way, and the like.

Herein, the recognition of the motion of the driver of object vehicle B refers to recognition of a type of a corresponding "a motion of the driver of the object vehicle" through pattern recognition processing using camera images taken by the on-vehicle camera corresponding to action monitor 5, "a motion of the driver of the object vehicle" stored in action prediction DB 2c, and the like. Travel state determination section 1e recognizes a motion of an eye or an arm of the driver of the object vehicle B through, for example, known template matching.

Next, travel state determination section 1e determines whether the driver of object vehicle B will give way based on action prediction DB 2c (step S8). In other words, travel state determination section 1e predicts the action of object vehicle B based on action prediction DB 2c, the action being either waiting at intersection LQ for giving way or entering intersection LQ.

In step S8, when determining that the driver of object vehicle B will give way (step S8: YES), travel state determination section 1e generates the travel command signal for allowing entry into intersection LQ to cause subject vehicle A to enter intersection LQ without a stop (step S9). In contrast, when determining that the driver of object vehicle B will not give way (step S8: NO), travel state determination section 1e generates the travel command signal for restricting entry into intersection LQ to cause subject vehicle A to stop before intersection LQ until the object vehicle passes through intersection LQ (step S10).

Note that, in step S8, when failing to predict the action of object vehicle B at intersection LQ, travel state determination section 1e preferably generates the travel command signal for restricting entry into intersection LQ for ensuring safety.

Control device 1 according to the present exemplary embodiment performs such processing to prevent subject vehicle A and object vehicle B from both politely urging the other to go ahead and resulting in a deadlock at intersection LQ or subject vehicle A from entering intersection LQ at the same time with object vehicle B.

As described above, control device 1 for the autonomous driving vehicle according to the present exemplary embodiment can predict the action of object vehicle B at intersection LQ based on the motion of the driver of object vehicle B or the motion of object vehicle B to determine the travel state such as timing where subject vehicle A is caused to enter intersection LQ. Accordingly, the autonomous driving vehicle can smoothly pass through intersection LQ as if the intention of the driver of object vehicle B is grasped, which allows smooth traffic to be ensured even in a situation where the autonomous driving vehicle and a conventional vehicle coexist.

In particular, even in a case where the traffic rules specify a priority road, control device 1 can predict the action of object vehicle B to determine timing of entry into intersection LQ without blindly adhering to the traffic rules, but in consideration of the traffic rules. This allows smoother traffic to be ensured.

Further, control device 1 is configured to use the on-vehicle camera as action monitor 5 to identify a type of the motion of the driver of object vehicle B and predict the action of object vehicle B based on the type of the motion thus identified. Accordingly, in a motorized society, a gesture such as eye contact or hand waving that is typically used for communication with the driver of the object vehicle can be identified, which makes the action of object vehicle B predictable with high accuracy.

First Modification of First Exemplary Embodiment

In the exemplary embodiment, a point where two travel lanes L1, L2 are orthogonal to each other has been described as an example of intersection LQ where control device 1 determines the travel state. However, control device 1 according to the exemplary embodiment is applicable to various types of intersections LQ.

Figure 4:
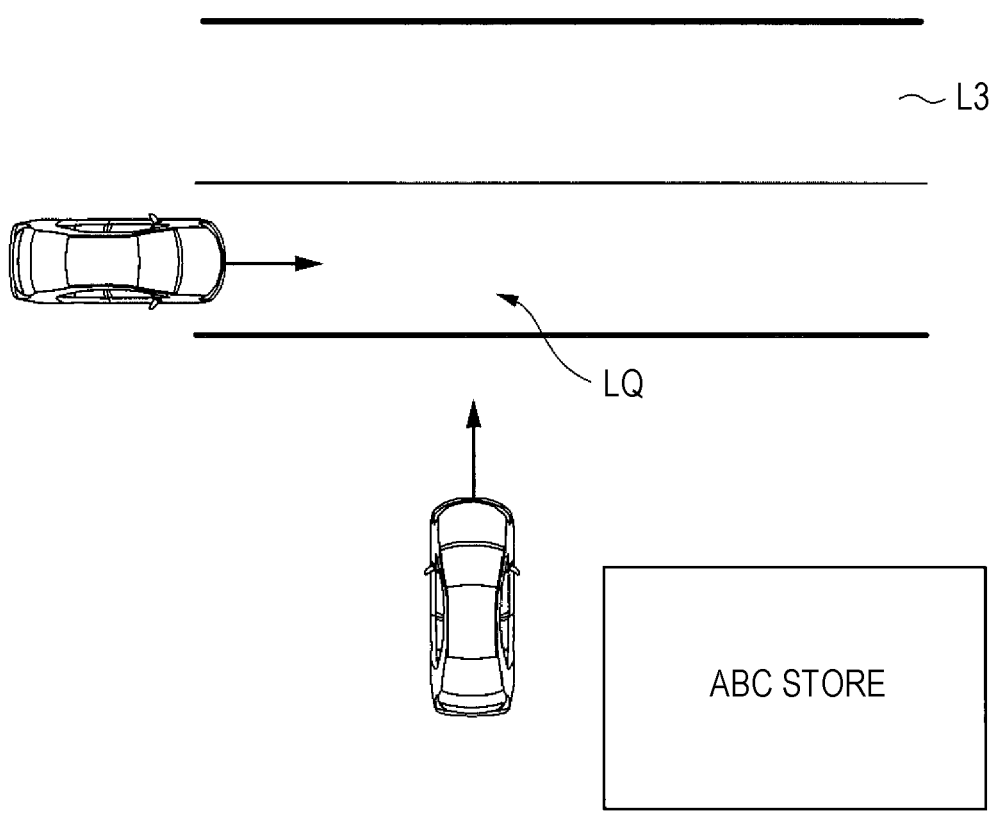
FIG. 4 is a diagram showing an example of an intersection to which a control device according to a first modification of the first exemplary embodiment is applied.

FIG. 4 is a diagram showing an example of intersection LQ according to a first modification.

In FIG. 4, it is different from the first exemplary embodiment in that intersection LQ is a point where merging with travel lane (lane) L3 from a store is made. Note that a description of configurations common to those of the first exemplary embodiment will be omitted (the same also applies to the following other exemplary embodiments).

FIG. 4 shows a situation where subject vehicle A trying to enter travel lane L3 from the store approaches object vehicle B traveling on travel lane L3. Even at such intersection LQ, as in the first exemplary embodiment, subject vehicle A and object vehicle B may give way to each other, which results in a deadlock.

However, as in the first exemplary embodiment, the action of the driver of object vehicle B is predicted based on the motion and the like of the driver of object vehicle B, and then timing of entry into intersection LQ is determined, which makes it possible to prevent vehicles giving way to each other at intersection LQ from resulting in a deadlock. This allows smooth traffic to be ensured.

Further, it is needless to say that control device 1 according to the exemplary embodiment is applicable to other intersections LQ such as a point where travel lanes extending in three directions intersect each other.

Second Modification of First Exemplary Embodiment

In the exemplary embodiment, as an example of the configuration for prediction about the action of object vehicle B, an aspect where the on-vehicle camera is used as action monitor 5, and travel state determination section 1e of control device 1 identifies a type of the motion of the driver of object vehicle B and the like from camera images taken by the on-vehicle camera has been described. However, such a configuration for prediction about the action of object vehicle B may be variously modified.

Figure 5:
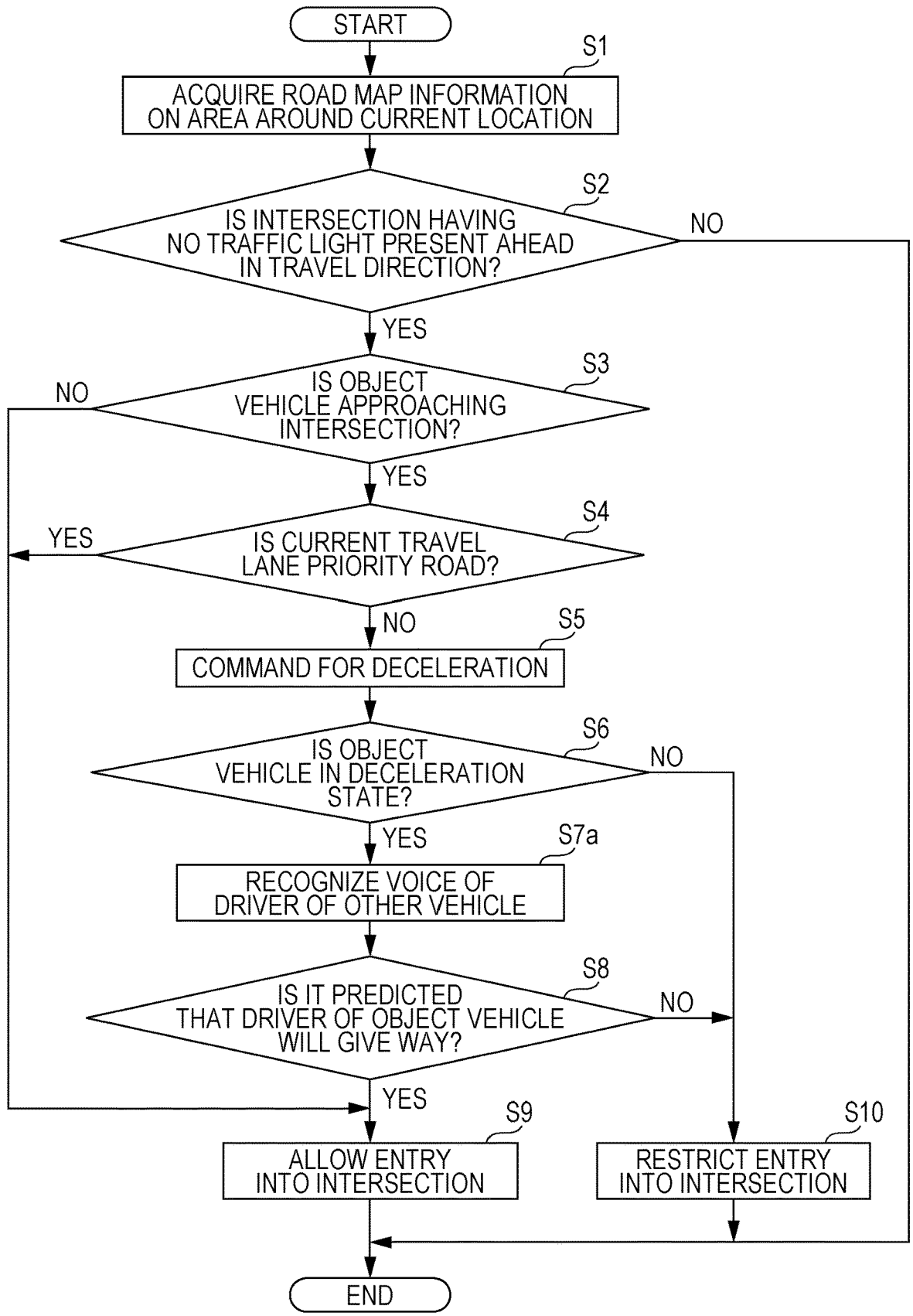
FIG. 5 is a diagram showing an example of an operation flow of a control device according to a second modification of the first exemplary embodiment.

FIG. 5 is a diagram showing an example of an operation flow of control device 1 according to a second modification.

In FIG. 5, it is different from the first exemplary embodiment in that an acoustic sensor is used as action monitor 5, and control device 1 predicts the action of object vehicle B based on a voice through processing of step S7 (in FIG. 5, denoted by S7a).

In this configuration, action prediction DB 2c stores a correspondence between "a voice uttered by the driver of the object vehicle" and "a predicted action of the object vehicle". For example, action prediction DB 2c stores, as the predicted action, an action where object vehicle B stops before intersection LQ and waits when the driver of object vehicle B utters words "please go ahead".

Then, when the driver of object vehicle B utters a voice, for example, travel state determination section 1e of control device 1 performs, in the processing of step S7a, voice recognition on the voice based on data in action prediction DB 2c.

Then, in step S8, when determining that the driver of object vehicle B will give way as the predicted action (step S8: YES), travel state determination section 1e generates the travel command signal for allowing entry into intersection LQ to cause subject vehicle A to enter intersection LQ without a stop (step S9). In contrast, when determining that the driver of object vehicle B will not give way as the predicted action (step S8: NO), travel state determination section 1e generates the travel command signal for restricting entry into intersection LQ to cause subject vehicle A to stop before intersection LQ until object vehicle B passes through intersection LQ (step S10).

Even such a configuration allows for prediction about the action of the driver of object vehicle B from the voice of the driver of object vehicle B to determine timing of entry into intersection LQ as in the first exemplary embodiment.

Second Exemplary Embodiment

Next, with reference to FIG. 6, control device 1 according to a second exemplary embodiment will be described.

Figure 6:
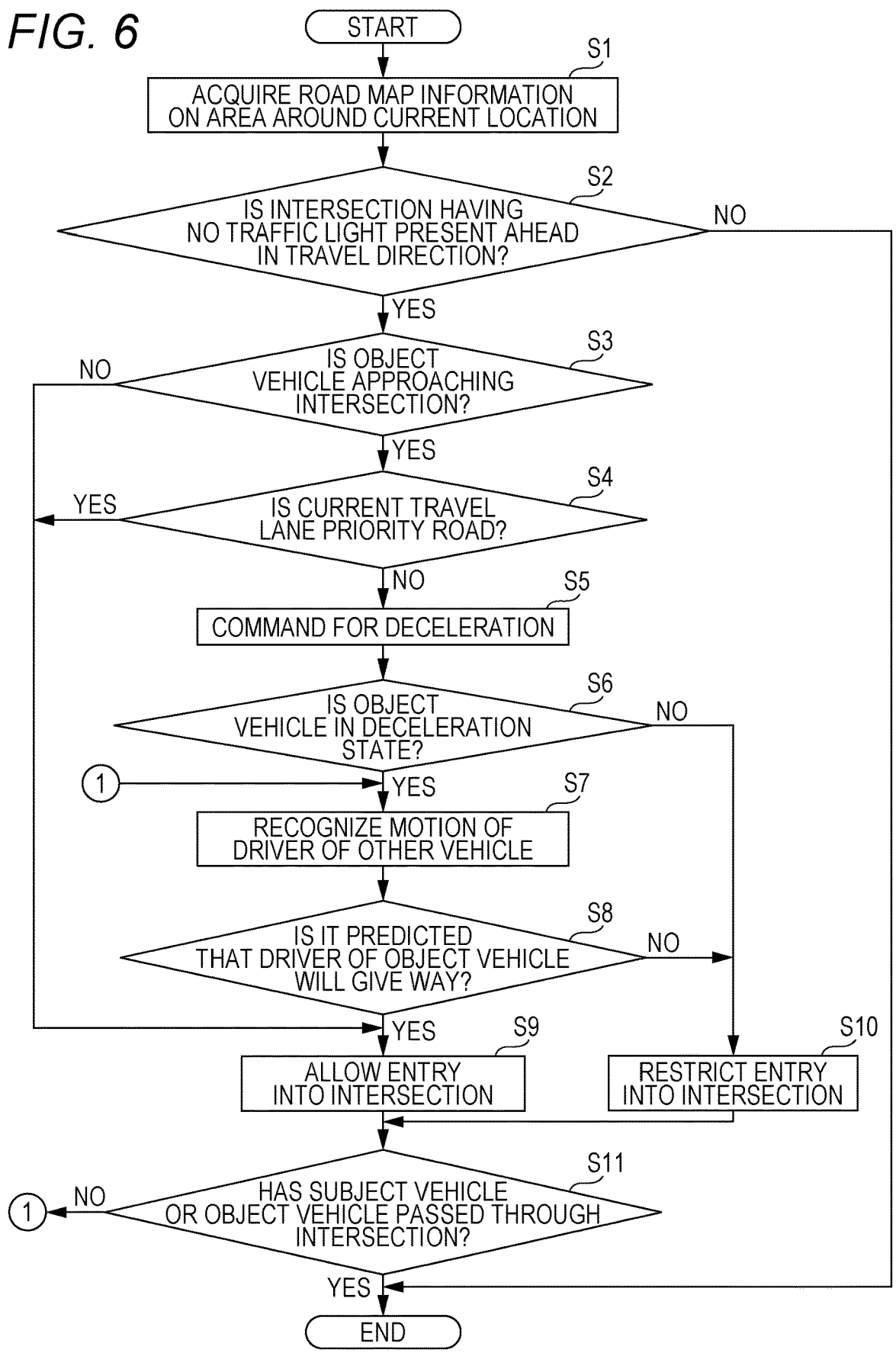
FIG. 6 is a diagram showing an example of an operation flow of a control device according to a second exemplary embodiment.

FIG. 6 is a diagram showing an example of an operation flow of control device 1 according to the second exemplary embodiment.

In FIG. 6, it is different from the first exemplary embodiment in that processing of step S11 where the motion of object vehicle B is monitored until subject vehicle A or object vehicle B passes through intersection LQ is added to the operation flow shown in FIG. 3.

Step S11 is processing where travel state determination section 1e of control device 1 determines whether subject vehicle A or object vehicle B has passed through intersection LQ.

In step S11, travel state determination section 1e determines, based on the detection signal of location sensor 3 or action monitor 5, whether, for example, subject vehicle A or object vehicle B has passed through intersection LQ. Then, when determining that subject vehicle A or object vehicle B has passed through intersection LQ (step S11: YES), travel state determination section 1e brings this operation flow to an end. In contrast, when determining that subject vehicle A or object vehicle B has not passed through intersection LQ (step S11: NO), travel state determination section 1e returns to the processing of step S7, and then detects the motion of the driver of object vehicle B and performs the determination processing of step S8 again.

In the operation flow shown in FIG. 3, only one-time determination processing determines whether object vehicle B will enter intersection LQ from the action of object vehicle B predicted based on the motion of the driver of object vehicle B, which may result in erroneous prediction about the action of object vehicle B. For example, a correspondence between the motion of the driver of object vehicle B and an intention indicated by the motion of the driver of object vehicle B may be different from any one of the correspondences stored in action prediction DB 2c.

Therefore, even after generating the travel command signal for allowing subject vehicle A to enter intersection LQ, travel state determination section 1e returns to the processing of step S7, and then monitors the motion of the driver of object vehicle B and performs the determination processing of step S8 again. This allows travel state determination section 1e, even when making an erroneous prediction about the action of object vehicle B, to correct the prediction.

Note that, in light of the above, it is preferable that the processing of step S8 can determine, based on action prediction DB 2c, whether the prediction about the action of object vehicle B matches an action of object vehicle B actually taken.

As described above, even when making an erroneous prediction about the action of object vehicle B, control device 1 according to the present exemplary embodiment can correct the prediction to an appropriate predicted action, which allows smoother traffic to be ensured.

Other Exemplary Embodiments

The present invention is not limited to the above-described exemplary embodiments, and various modifications are conceivable.

In the exemplary embodiments, as an example of the configuration of control device 1, a configuration where the respective functions of first input section 1a, second input section 1b, third input section 1c, state determination section 1d, and travel state determination section 1e are implemented by a single computer has been described, but it is needless to say that the functions may be implemented by a plurality of computers. For example, the function of travel state determination section 1e may be implemented by a plurality of computers.

Further, in the exemplary embodiments, as an example of the configuration of control device 1, a configuration where the processing of state determination section 1d and travel state determination section 1e is performed in a single flow has been described, but some of the processing may be performed in parallel.

Further, in the exemplary embodiments, as an example of the configuration of control device 1, a configuration where control device 1 is a device separate from vehicle ECU 6 has been described, but it is needless to say that an aspect where control device 1 is implemented as a part of vehicle ECU 6 may be employed.

Further, in the exemplary embodiments, an aspect where location sensor 3, object vehicle monitoring sensor 4, and action monitor 5 are implemented by a GPS receiver, a millimeter-wave radar, and an on-vehicle camera, respectively, has been described as an example. However, location sensor 3, object vehicle monitoring sensor 4, and action monitor 5 may be each implemented by any sensor as long as their respective functions are achieved, and location sensor 3, object vehicle monitoring sensor 4, and action monitor 5 may be implemented by a common sensor. For example, location sensor 3, object vehicle monitoring sensor 4, and action monitor 5 may be implemented by one common on-vehicle camera.

At least the following matter will be apparent from the description of the specification and the accompanying drawings.

Control device 1 for autonomous driving vehicle A controls travel at intersection LQ that is ahead of autonomous driving vehicle A in the travel direction. Control device 1 includes first input section 1a, second input section 1b, and travel state determination section 1e. First input section 1a acquires the detection signal of first sensor 4 that detects object vehicle B approaching intersection LQ. Second input section 1b acquires the detection signal of second sensor 5 that detects at least one of the motion of the driver of object vehicle B, the voice of the driver of object vehicle B, the motion of object vehicle B, and the radio signal output from object vehicle B. Travel state determination section 1e generates, upon detection of object vehicle B based on the detection signal of first sensor 4, the travel command signal for allowing or restricting entry of autonomous driving vehicle A into intersection LQ in accordance with the action of object vehicle B predicted based on the detection signal of second sensor 5.

Control device 1 can determine timing of entry into intersection LQ based on the predicted action of object vehicle B when autonomous driving vehicle A meets object vehicle B at intersection LQ, which makes smooth traffic possible even in a situation where autonomous driving vehicle A and a manually-driven vehicle coexist.

Further, travel state determination section 1e may refer to traffic rule data specifying a priority road at intersection LQ and generate the travel command signal in accordance with the action of object vehicle B predicted based on the detection signal of second sensor 5 and the traffic rule data.

Even in a case where the traffic rules specify a priority road, control device 1 can identify whether the driver of object vehicle B will first enter intersection LQ or the driver will give way to autonomous driving vehicle A, and can determine timing of entry into intersection LQ without blindly adhering to the traffic rules, but in consideration of the traffic rules.

Further, second sensor 5 may be an on-vehicle camera that takes an image of object vehicle B, and travel state determination section 1e may be configured to identify a type of the motion of the driver of object vehicle B based on the detection signal of second sensor 5 and generate the travel command signal in accordance with the action of object vehicle B predicted based on the type of motion thus identified.

Control device 1 can identify a type of a motion of a driver that is typically used for communication in a motorized society and predict the action of object vehicle B based on the type of the motion thus identified. Accordingly, the action of object vehicle B can be predicted with high accuracy.

Further, travel state determination section 1e may repeatedly predict the action of object vehicle B based on the detection signal of second sensor 5 until the autonomous driving vehicle A or object vehicle B passes through intersection LQ and generate the travel command signal in accordance with the action of object vehicle B thus predicted.

Even when making an erroneous prediction about the action of object vehicle B, control device 1 can correct the prediction to an appropriate predicted action, which allows smoother traffic to be ensured.

Further, the control program for autonomous driving vehicle A controls travel at intersection LQ that is ahead of the autonomous driving vehicle A in the travel direction. The control program causes a computer to execute acquiring the detection signal of first sensor 4, acquiring the detection signal of second sensor 5, and generating a travel command signal. In the acquiring of the detection signal of first sensor 4, the detection signal of first sensor 4 is acquired. First sensor 4 is configured to detect object vehicle B approaching intersection LQ that is ahead of autonomous driving vehicle A in the travel direction. In the acquiring of the detection signal of second sensor 5, the detection signal of second sensor 5 is acquired. Second sensor 5 is configured to detect at least one of the motion of the driver of object vehicle B, the voice of the driver of object vehicle B, the motion of object vehicle B, and the radio signal output from object vehicle B. In the generating of the travel command signal, when object vehicle B is detected based on the detection signal of first sensor 4, the travel command signal for allowing or restricting entry of autonomous driving vehicle A into intersection LQ is generated in accordance with the action of object vehicle B predicted based on the detection signal of second sensor 5.

Note that the control program for autonomous driving vehicle A can be used in such a manner as to be recorded on a non-transitory storage medium such as a digital versatile disc (DVD).

Although specific examples of the present invention have been described above in detail, these examples are mere exemplifications and are not intended to limit the scope of claims. The technique described in the claims includes various variations and changes of the specific examples exemplified above.

INDUSTRIAL APPLICABILITY

The control device according to the present disclosure may be suitably used for determining a travel state at an intersection for travel control of an autonomous driving vehicle.

REFERENCE MARKS IN THE DRAWINGS

1: control device
1a: first input section
1b: second input section
1c: third input section
1d: state determination section
1e: travel state determination section
2: storage device
2a: road map DB
2b: traffic rule DB
2c: action prediction DB
3: location sensor
4: object vehicle monitoring sensor (first sensor)
5: action monitor (second sensor)
6: vehicle ECU
A: subject vehicle (autonomous driving vehicle, vehicle)
B: object vehicle
L1: travel lane (lane)
L2: travel lane (lane)
L3: travel lane (lane)
LQ: intersection

The invention claimed is:

1. A control device for an autonomous driving vehicle that controls travel at an intersection that is ahead of the autonomous driving vehicle in a travel direction, the control device comprising:
a first input circuit that acquires a detection signal of a first sensor that detects another vehicle approaching the intersection, the intersection having no traffic light;
a second input circuit that acquires a detection signal of a second sensor that detects at least one of a motion of a driver of the other vehicle, a voice of the driver of the other vehicle, a gesture of the other vehicle, and a radio signal output from the other vehicle;
a state determination circuit that
predicts a movement of the other vehicle based on the detection signal of the first sensor or the detection signal of the second sensor, and
determines whether the intersection having no traffic light is present ahead of the autonomous driving vehicle in the travel direction; and
a travel state determination circuit that generates, upon detection of the other vehicle based on the detection signal of the first sensor, a travel command signal for allowing or restricting entry of the autonomous driving vehicle into the intersection in accordance with an action of the other vehicle predicted based on the detection signal of the second sensor, wherein
the travel state determination circuit determines whether a travel lane on which the autonomous driving vehicle is traveling is a priority road at the intersection, when the intersection having no traffic light is present ahead of the autonomous driving vehicle in the travel direction,
when the travel lane on which the autonomous driving vehicle is traveling is the priority road at the intersection, the travel state determination circuit generates the travel command signal for allowing entry of the autonomous driving vehicle into the intersection in view of the predicted movement of the other vehicle based on the detection signal of the first sensor, and
when the travel lane on which the autonomous driving vehicle is traveling is not the priority road at the intersection,
the travel state determination circuit determines whether the driver of the other vehicle gives way in accordance with the movement of the other vehicle predicted based on the detection signal of the second sensor, and
when the travel state determination circuit determines that the driver of the other vehicle gives way, the travel state determination circuit generates the travel command signal for allowing entry of the autonomous driving vehicle into the intersection.

2. The control device according to claim 1, wherein the travel state determination circuit refers to traffic rule data specifying the priority road at the intersection and generates the travel command signal in accordance with the action of the other vehicle predicted based on the detection signal of the second sensor and the traffic rule data.

3. The control device according to claim 1, wherein the second sensor is an on-vehicle camera that takes an image of the other vehicle, and
the travel state determination circuit identifies a type of the motion of the driver of the other vehicle based on the detection signal of the second sensor and generates the travel command signal in accordance with the action of the other vehicle predicted based on the type of the motion identified.

4. The control device according to claim 1, wherein
the travel state determination circuit repeatedly predicts the action of the other vehicle based on the detection signal of the second sensor until the autonomous driving vehicle or the other vehicle passes through the intersection and generates the travel command signal in accordance with the action of the other vehicle predicted.

5. A non-transitory recording medium storing a control program for an autonomous driving vehicle that controls travel at an intersection that is ahead of the autonomous driving vehicle in a travel direction, the control program causing a computer to execute:
  acquiring a detection signal of a first sensor that detects another vehicle approaching the intersection, the intersection having no traffic light;
  acquiring a detection signal of a second sensor that detects at least one of a motion of a driver of the other vehicle, a voice of the driver of the other vehicle, a motion of the other vehicle, and a radio signal output from the other vehicle;
  predicting a movement of the other vehicle based on the detection signal of the first sensor or the detection signal of the second sensor;
  determining whether the intersection having no traffic light is present ahead of the autonomous driving vehicle in the travel direction;
  generating, upon detection of the other vehicle based on the detection signal of the first sensor, a travel command signal for allowing or restricting entry of the autonomous driving vehicle into the intersection in accordance with an action of the other vehicle predicted based on the detection signal of the second sensor; and
  determining whether a travel lane on which the autonomous driving vehicle is traveling is a priority road at the intersection, when the intersection having no traffic light is present ahead of the autonomous driving vehicle in the travel direction, wherein
  when the travel lane on which the autonomous driving vehicle is traveling is determined to be the priority road at the intersection, the travel command signal for allowing entry of the autonomous driving vehicle into the intersection is generated in view of the predicted movement of the other vehicle based on the detection signal of the first sensor, and
  when the travel lane on which the autonomous driving vehicle is traveling is determined not to be the priority road at the intersection,
    determining whether the driver of the other vehicle gives way in accordance with the movement of the other vehicle predicted based on the detection signal of the second sensor, and
    when the driver of the other vehicle is determined to give way, the travel command signal for allowing entry of the autonomous driving vehicle into the intersection is generated.

\* \* \* \* \*